(12) United States Patent
Delio

(10) Patent No.: US 9,197,519 B2
(45) Date of Patent: Nov. 24, 2015

(54) TRACKING OBJECTS WITHIN DYNAMIC ENVIRONMENTS

(71) Applicant: RIVERBED TECHNOLOGY, INC., San Francisco, CA (US)

(72) Inventor: John Delio, Manchester, NH (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 386 days.

(21) Appl. No.: 13/693,165

(22) Filed: Dec. 4, 2012

(65) Prior Publication Data

US 2013/0151697 A1 Jun. 13, 2013

Related U.S. Application Data

(60) Provisional application No. 61/568,678, filed on Dec. 9, 2011.

(51) Int. Cl.
| | | |
|---|---|---|
| *G06F 15/173* | (2006.01) | |
| *H04L 12/26* | (2006.01) | |
| *H04L 12/24* | (2006.01) | |
| *G06F 7/00* | (2006.01) | |
| *G06F 3/00* | (2006.01) | |

(52) U.S. Cl.
CPC .............. *H04L 43/00* (2013.01); *H04L 41/024* (2013.01); *H04L 41/0233* (2013.01)

(58) Field of Classification Search
CPC ... H04L 29/08072; H04L 29/06; H04L 43/00; H04L 12/2602
USPC ........................................................ 709/224
See application file for complete search history.

*Primary Examiner* — Chris Parry
*Assistant Examiner* — Alan S Chou
(74) *Attorney, Agent, or Firm* — Park, Vaughan, Fleming & Dowler LLP; Laxman Sahasrabuddhe

(57) ABSTRACT

Embodiments provide systems, methods, and computer program products for tracking objects within a domain and their possible changes and genealogy over time. An object identifier and an interval identifier are associated with an object that enters the domain with an unknown set of attributes and genealogy. The object identifier is analyzed to determine whether it is a pre-existing object identifier. A comparison of the interval identifier is performed to determine whether the object is a copy of a prior object. The object identifier is replaced with a new object identifier and the interval identifier reset when the object is new or a copy. Based on the object identifier and the interval identifier, which represents the possibility of change during each interval, information about the tracked object may be derived and analyzed to enhance performance.

20 Claims, 7 Drawing Sheets

TRACKING OBJECTS WITHIN DYNAMIC ENVIRONMENTS

CROSS-REFERENCE TO RELATED APPLICATIONS

The present application claims the benefit of U.S. Provisional Patent Application No. 61/568,678, filed on Dec. 9, 2011, which is incorporated herein by reference in its entirety.

BACKGROUND

1. Technical Field

The present disclosure relates generally to an object tracking system for tracking objects within dynamic environments.

2. Background Art

In virtualized and cloud computing environments, a virtualized machine or server instance needs to be started in order for hosted software on the virtualized machine/server instance to run. One such type of hosted software is a monitoring tool for the environment, which may be used to track an object, such as a virtual machine, and the object's genealogy created after entrance to the environment's domain. The monitoring tool may be useful to assist performance tracking tools obtain performance information about the virtual environment. The monitoring tool is not notified prior to the entrance or exit of the object within the environment, such as the starting, cloning, or stopping of the virtual machine. Since the attributes of the object are unknown to the monitoring tool upon entrance to the environment, the monitoring tool is unable to maintain tracking of the object once the object has exited and reentered the environment, such as the virtual machine having stopped and restarted. Each time a virtual machine is started, it is assigned a new Internet Protocol (IP) address and host name. As a result, it is difficult for the monitoring tool to track the environment across multiple starts, stops, and new instances.

Prior developers have sought to address this issue by placing their own monitoring system on top of the environment, requiring all communication to first pass through the monitoring system in order to detect when objects, such as virtual machine instances, are stopped, started, and copied/cloned. However, this approach introduces a bottleneck into the data flow and restricts the applicability of the monitoring system to only those environments with monitoring system interface support.

Accordingly, there is a need for methods, systems, and computer program products to provide an object tracking system that persists across and within dynamic environments.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
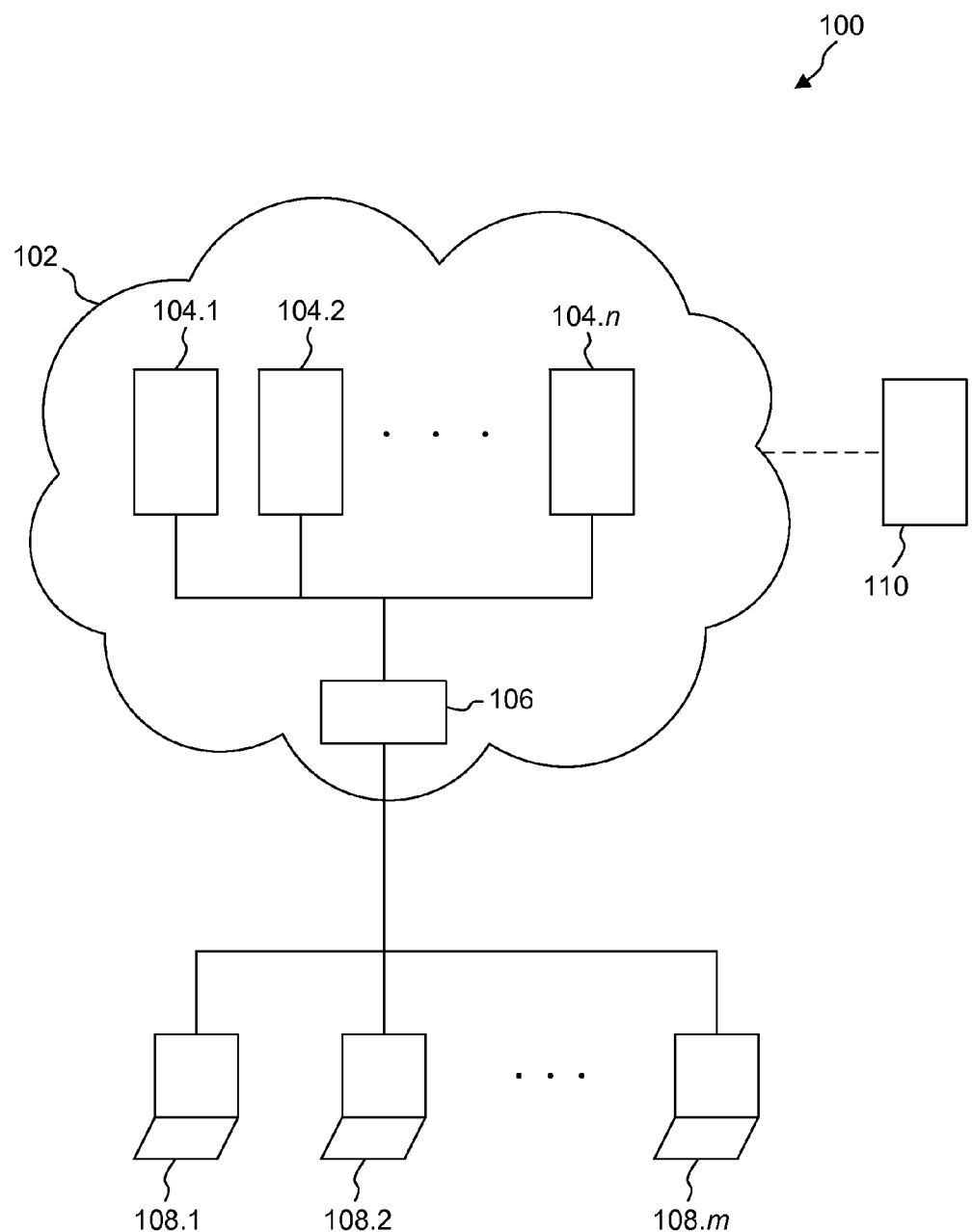
FIG. 1 illustrates an exemplary operating environment according to an embodiment.

FIG. 1 illustrates an exemplary operating environment 100 according to an embodiment of the present disclosure. Exemplary operating environment 100 is depicted as a cloud computing environment. However, this is provided for the purpose of illustration and is not limiting to embodiments of the present disclosure. As shown in FIG. 1, exemplary operating environment 100 includes cloud services 102, cloud servers 104.1 through 104.n, a cloud gateway 106, computers 108.1 through 108.m, and a subscribing client 110.

In an embodiment, the cloud servers 104.1 through 104.n are servers networked together in a cloud environment. The cloud servers 104.1 through 104.n may be configured to provide a variety of cloud services 102 over a network, such as over public extranets or private intranets. Some examples of services include application software, platform computing, or infrastructure. For example, when offering infrastructure as the cloud service 102, the cloud servers 104.1 through 104.n may serve as one or more virtual machines for subscribing clients, such as subscribing client 110.

The computers 108.1 through 108.m represent one or more users/consumers of the cloud services 102. The computers 108.1 through 108.m may access the services offered by the cloud services 102 via a multitude of means, such as any one or more of wired or wireless communication means (e.g., Ethernet, 802.11 wireless, LTE, 3G, etc). The computers 108.1 through 108.m may be any one or more of a variety of computing devices, such as a desktop computer, a laptop computer, a mobile phone, a tablet, a personal digital assistant, or any other type of computing device that is capable of accessing cloud services 102, as will be recognized by the person skilled in the relevant art(s).

In one example, the subscribing client 110 may be an online retailer that utilizes one or more virtual machines offered by the cloud services 102 as web servers to host web traffic. In this situation, computers 108.1 through 108.m may each seek to perform separate transactions with the subscribing client 110 via the cloud services 102. As the number of computers 108.1 through 108.m increases, the cloud services 102 may need to increase the number of virtual machines allocated to the subscribing client 110 in order to support the increased web traffic and transaction volume. In such a situation, the cloud servers 104.1 through 104.n may dynamically create new virtual machines—such as by cloning server instances of previous server instances—for the subscribing client 110 to support the increased demand.

Figure 2:
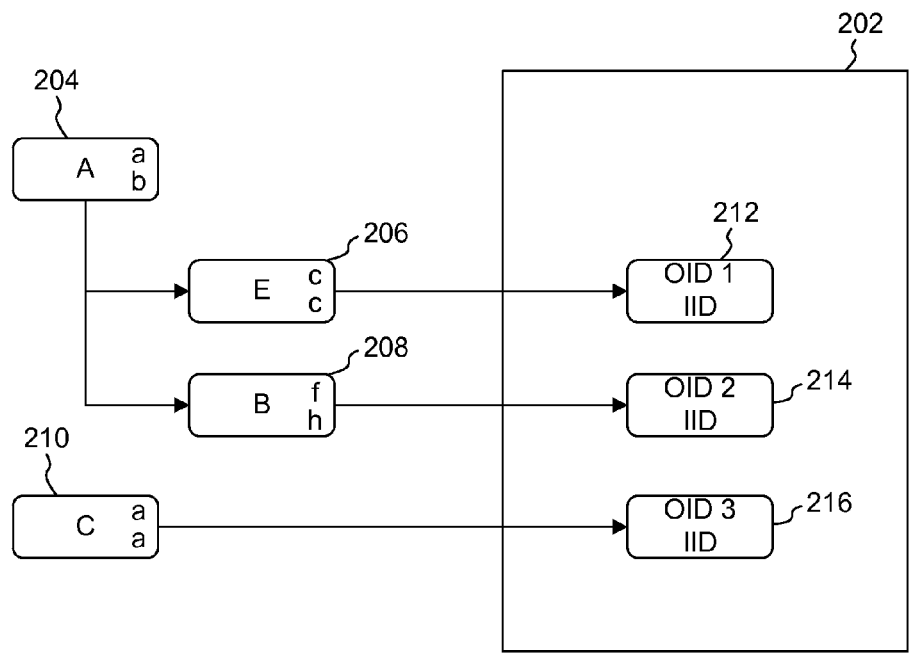
FIG. 2 illustrates an exemplary domain according to an embodiment.

FIG. 2 illustrates an exemplary monitoring domain 202 according to an embodiment. Monitoring domain 202 may include an object tracking system (not shown). Exemplary monitoring domain 202 is provided for the purpose of illustration only and is not limiting. Objects 204, 206, 208, and 210 may represent any types of objects that may be tracked, for example virtual machines, server images and instances, mobile devices, and other objects as will be recognized by the person skilled in the relevant art(s). For example, objects 204, 206, 208, and 210 in FIG. 2 may first exist outside of the monitoring domain 202. The number of objects is exemplary only, and more or fewer objects can be supported in other embodiments, as will be recognized by the person skilled in the relevant art(s).

Each of the objects 204, 206, 208, and 210 may have various attributes, including for example server attributes in a virtual computing environment. For example, object 204 may include attributes a and b. Object 206 may include the attribute c and its genealogy, which includes its ancestry, may be based on the object 204. Object 208 may include the attributes f and h and its genealogy may be based on the object 204. Object 210 may include the attribute a. In an embodiment, neither the genealogy nor the attributes of any given object remain when the objects 204, 206, 208, or 210 enter the monitoring domain 202.

Since the genealogy and attributes of objects 204, 206, 208, and 210 are not available within the monitoring domain 202, the object tracking system assigns a unique numerical identifier to each object that enters the monitoring domain 202. For example, FIG. 2 illustrates objects 206, 208, and 210 as entering the monitoring domain 202. The object tracking system assigns a unique object identifier (OID) of 1 to object 206, which is now recognized as unique object 212 within the monitoring domain 202. The object tracking system further assigns OIDs of 2 and 3 to objects 208 and 210, respectively, which are now recognized as unique objects 214 and 216. The object tracking system may assume that each object that enters the monitoring domain 202 is unique, thus warranting a different OID for each object.

The OID may be generated using any algorithm capable of generating a unique identifier for each object that enters the monitoring domain 202. In an embodiment, the OID is generated using an algorithm that is capable of assigning an identifier that is unique across multiple domains where the object identity system is used. For example, the OID may be a universally unique identifier (UUID) that may use a 128 bit value to uniquely identify objects. As will be recognized by the person skilled in the relevant art(s), other size values and/or algorithms may be utilized in order to generate and maintain each OID.

Since the object tracking system does not have knowledge of each object's attributes within the monitoring domain 202, the object tracking system is unable to detect changes that occur in the objects 212, 214, and 216. Accordingly, in an embodiment, once each object within the monitoring domain 202 has an OID assigned to it, the object tracking system assigns an interval identifier (IID) to each object. The IID is useful to track the possibility of change to each object over time, instead of change itself over time. Tracking the possibility of change may be useful, for example, for tracking when objects 212, 214, and 216 are duplicated or the number of times each object has been subjected to possible changes. Tracking the possibility of change may additionally be useful in situations where additional tracking agents are able to provide further information about objects 212, 214, and 216 at a given point in time.

In particular, the IID is used to track intervals of time within which objects 212, 214 and 216 are subjected to the possibility of change. The IID may be an integer that is incremented by one each time the IID encounters an additional interval. This enables the object tracking system to derive the number of times objects 212, 214, and 216 have been subjected to possible change over time. This also enables derivation of the chronological order in which each possible change may have occurred. The incrementing may occur at any stage of an interval, for example at the beginning or end of the interval, or at any other time as will be recognized by persons skilled in the relevant art(s).

In an embodiment, the amount of time within intervals may vary. For example, the user of the object tracking system, for example the owner of the subscribing client 110, may determine the best intervals to describe the monitoring domain 202. Further, the choice of time interval amount may be, itself, an additional data point that the object tracking system may track and use to derive information.

The object tracking system's monitoring domain 202 may be implemented in a variety of systems and environments. In one embodiment, the monitoring domain 202 is implemented within a virtualized computing environment, such as operating environment 100, where the subscribing client 110 may monitor performance, objects, and genealogy by tracking the objects as they enter the monitoring domain 202.

Figure 3:
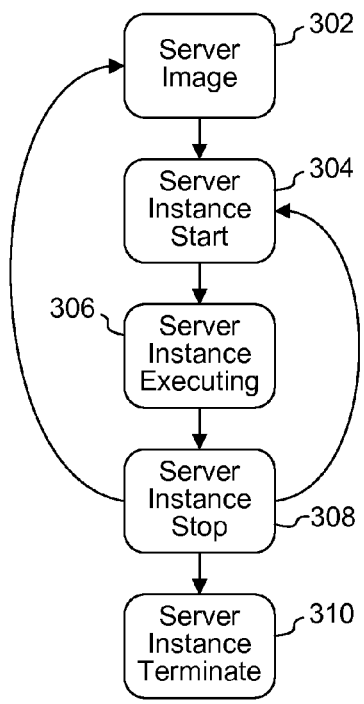
FIG. 3 illustrates an exemplary lifecycle of a server instance according to an embodiment.

For example, FIG. 3 illustrates an exemplary lifecycle of a server instance within a cloud computing environment according to an embodiment. A server instance may exist in one or more of cloud servers 104.1 through 104.n, as will be recognized by persons skilled in the relevant art(s). A server image is instantiated at step 302, analogous to a virtual machine image in scope and function. The server image serves as a template for future server instances.

Subsequently, a server instance is generated and started at step 304 based on the server image. The server instance may be analogous to a virtual machine within a virtualized environment. Multiple server instances may be generated based on the same server image, as necessary or requested for a given service and client.

The server instance executes at step 306. After some period of time, when users are done with the server instance, the server instance is stopped at step 308. Once stopped, there are typically two choices regarding the lifecycle of the server instance. The server instance may either be restarted, returning to step 304, or the server instance may be terminated at step 308. If the server instance is terminated, the subscribing client 110 forfeits the existence of the instance and no subsequent functions may be carried out against that server instance. In the above exemplary lifecycle, a new server image may also be created from an existing instance.

Figure 4:
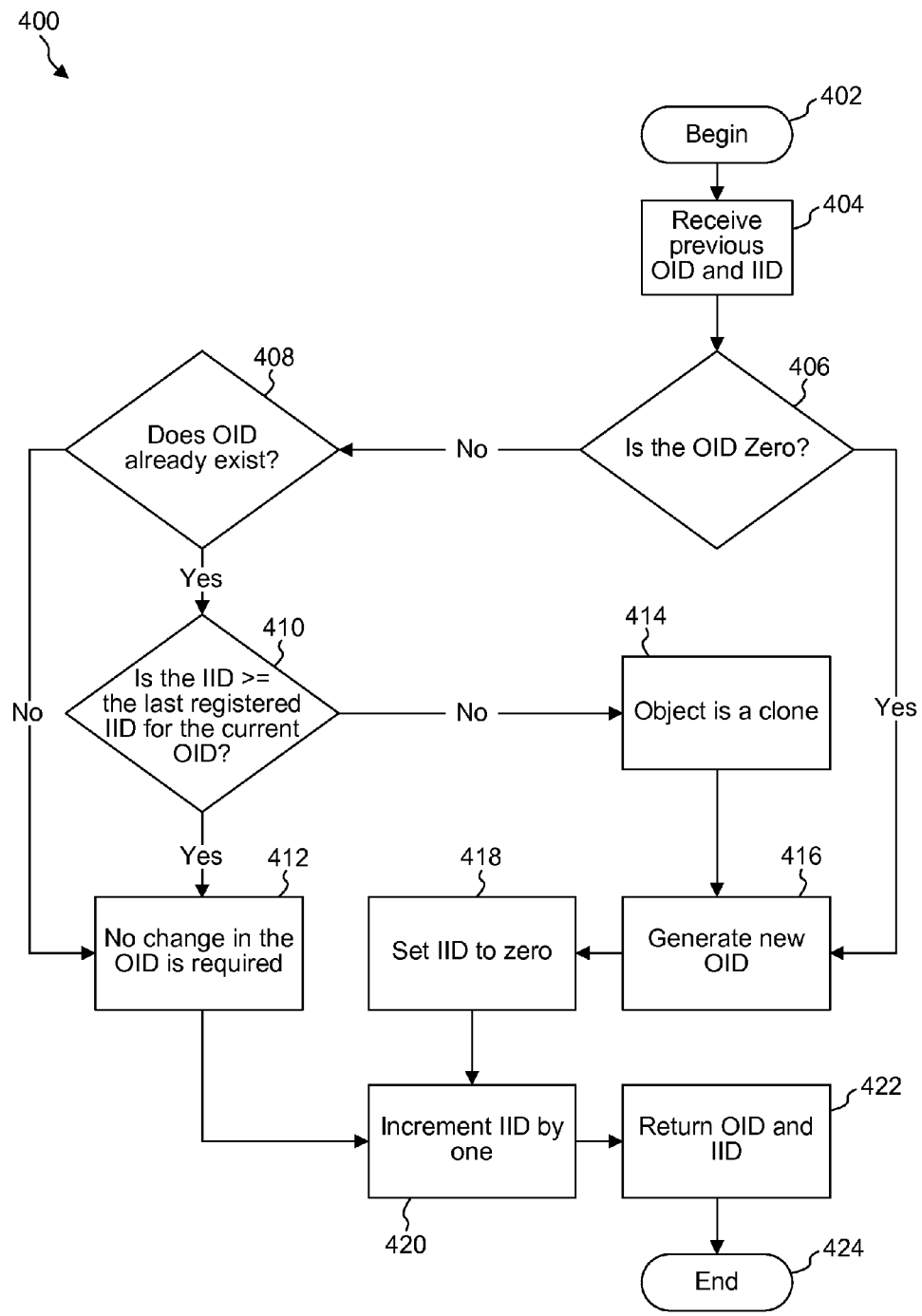
FIG. 4 is a flowchart of a process for tracking objects within a dynamic environment according to an embodiment.

FIG. 4 depicts a flowchart of an object tracking algorithm 400 according to an embodiment. Object tracking algorithm 400 is applicable generally to any domain in which objects may change over time. For sake of illustration only, the following discussion will focus on the algorithm's application to a process for tracking object instances within a dynamic environment, for example a virtual computing environment. The object tracking algorithm 400 may be implemented, for example, by one or more servers. In one embodiment, the one or more servers may be operated by a user of the object tracking algorithm 400, such as the subscribing client 110 for cloud services 102 of FIG. 1.

The object tracking algorithm 400 begins at step 402. For example, the object tracking algorithm begins when an object to be tracked within a domain, such as monitoring domain 202 from FIG. 2, first enters the domain being tracked, or is started up again in the domain, as in step 304 of FIG. 3.

At step 404, the object tracking algorithm 400 receives the previous OID and IID for the object. The previous OID and IID may be received from the object being tracked, for example a server instance, which has accessed a durable storage assigned to the server instance. The durable storage may be a hard drive associated with the server instance being executed.

At step 406, the object tracking algorithm 400 determines whether the previous OID is zero. If the object is a new server instance entering the domain being tracked, the previous OID value will not exist on the durable storage and the previous OID will be received as a zero value from the object being tracked. Otherwise, the previous OID value and associated previous IID will be received from the object being tracked.

If the previous OID from the object is not zero, then the object tracking algorithm 400 proceeds to step 408. This may occur, for example, where the object has existed previously in the domain being tracked. In one embodiment, a server instance is being tracked that was previously started, executed, stopped, and is now being started up again in the same or a different domain.

At step 408, the object tracking algorithm 400 determines whether the previous OID already exists, for example in a database maintained by the user of the object tracking algorithm 400, as will be discussed in more detail below with respect to FIG. 5. If the previous OID does not already exist in the database, the previous OID is accepted as the OID for the current object being tracked at step 412.

The previous OID may have a nonzero value while not existing in the database where, for example, the object currently being tracked was previously started and stopped in a different domain being tracked by the same user of the object tracking algorithm 400. In such a situation, the object itself, such as a server instance, would have stored the previous OID and associated IID into the server instance's assigned durable storage before termination. Thus, upon startup in the current domain being tracked in FIG. 4, an identity agent, as will be discussed in more detail below with respect to FIG. 5, retrieves the OID and IID previously stored for the server instance from the durable storage.

Once it has been determined at step 412 that no change is necessary to the OID and the previous OID accepted as the current OID, at step 420 the object tracking algorithm 400 increments the IID associated with the object by one. This indicates that a new interval is being tracked that began with step 402 and which ends with step 424.

Then at step 422, the object tracking algorithm 400 returns the OID and the IID of the current interval being tracked to the object being tracked, for example the server instance presently executing.

At step 424, the object tracking algorithm 400 ends. The object stores the OID it has received from the object tracking algorithm 400 to its associated durable storage. For example, the server instance writes the returned OID and newly incremented IID to its assigned durable storage. This data for the OID and the current IID may also be written to the database for future tracking.

Returning to step 408, where the OID does already exist in the database, the object tracking algorithm proceeds to step 410. At step 410, the object tracking algorithm 400 determines whether the previous IID retrieved from the durable storage for the object is greater than or equal to the last registered IID for the previous OID found within the database. If the previous IID retrieved from the durable storage is greater than or equal to the last registered IID in the database, then no change in the OID is required and the object tracking algorithm 400 proceeds to step 412. This situation may occur where the object being tracked by the object tracking algorithm 400 was previously tracked for the present domain and corresponding tracking information stored in the database.

If the previous IID retrieved from the durable storage is less than the last registered IID in the database, at step 414 the object tracking algorithm 400 determines that the current object being tracked is a copy of a previous object. This may occur, for example, where the current object being tracked is a server instance that was cloned from a previous server instance tracked within the domain.

When the object being tracked is a copy, such as a clone, the object tracking algorithm 400 proceeds to step 416, where the object tracking algorithm 400 generates a new OID for the object being tracked. Then, at step 418, the object tracking algorithm 400 sets the IID associated with the new OID generated in step 416 to zero.

At step 420, the object tracking algorithm 400 increments the IID by one. This indicates that a new interval is being tracked that began with step 402 and which ends with step 424. The object tracking algorithm 400 then proceeds with steps 422 and 424, as previously discussed.

Returning back to step 406, if the previous OID has a value of zero then the object tracking algorithm 400 proceeds directly to step 416 where it generates a new OID for the object being tracked. The object tracking algorithm 400 then proceeds to step 418, where the object tracking algorithm 400 sets the IID associated with the new OID generated in step 416 to zero. The object tracking algorithm 400 then proceeds to step 420, where the IID is incremented. The object tracking algorithm 400 then proceeds with steps 422 and 424, as previously discussed.

The object tracking algorithm, as discussed with respect to FIG. 4, will now be discussed with respect to exemplary embodiments.

One exemplary embodiment of the object tracking algorithm may be a virtualized environment, as has been introduced generally above. Conventionally, in a virtualized environment, users may interact with virtualization management software to create server images and instances. Software that is hosted on these server instances does not have the ability to access information pertaining to the user interaction with the virtualization management software. The hosted software on a server instance may query the virtualization management software for a limited amount of information, but it is often not possible for the hosted software to receive an event prior to an instance being started.

Figure 5:
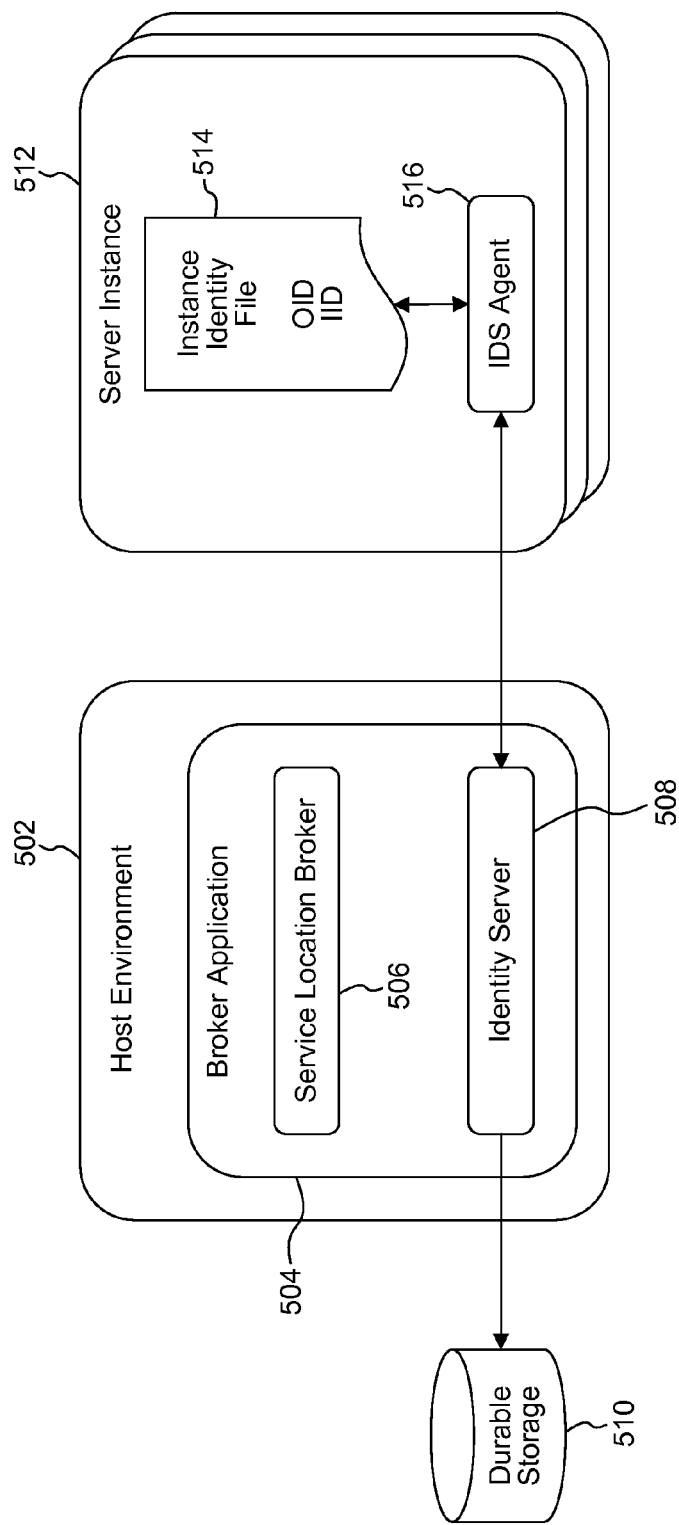
FIG. 5 illustrates an example application of the process for tracking objects according to an embodiment.

FIG. 5 illustrates an application of the object tracking algorithm 400 according to an embodiment involving a virtualized environment. As shown in FIG. 3, server images may be used in virtualized environments to generate numerous server instances. Each server instance may be transient, long-lived, restarted, cloned, or modified to use a different set of resources such as number of CPUs, memory, hard drive(s), and other hardware resources. Each server instance may also be used to create additional server images based on the instance's current state.

When virtualized servers are run within cloud computing environments, additional complexity arises. For example, some vendors of cloud computing, such as cloud services 102, may assign a different IP address and host name to a server instance each time the server instance restarts. With the numerous hardware and location abstractions in such an environment, it becomes increasingly difficult to track the location of services and the lifecycle of server instance(s) used to host those services.

A location broker model, according to an embodiment depicted in FIG. 5, may be combined with the object tracking algorithm 400 and function as part of the object tracking system of the present disclosure. A broker application 504 resides within a host environment 502 in communication with one or more server instances 512. The host environment 502 may utilize any appropriate means of communication, e.g. HTTP/S, direct TCP/IP, named pipes, to name just a few examples. The broker application 504 may be implemented in a single server, such as described in FIG. 8 below. Alternatively, the broker application 504 may be implemented using multiple servers combined in a network, as will be recognized by those skilled in the relevant art(s).

The broker application 504 may include two services for identity and location. An identity server 508 is a service that may be located within the broker application 504 and configured to implement the object tracking algorithm 400 for tracking service instances. For example, the identity server 508 may function as the object tracking system of the domain 202.

In order to retain server instance information across instance restarts, the identity server 508 writes the identity information, including at least the OID and IID of the server instance, to durable storage 510. Durable storage 510 may be a hard disk drive, removable storage, or other storage devices as will be recognized by persons skilled in the relevant art(s). In one embodiment, the durable storage 510 may be associated with a database. The durable storage 510 may allow for the possibility of maintaining redundant identity servers 508 for failover, so that in the event of one identity server 508 failing, the tracking of one or more server instances 512 would continue processing.

A service location broker 506 may be located within, or associated with, the broker application 504. The service location broker 506 may maintain a catalog of available services within the host environment 502 and provide notifications of service state changes to registered listeners. Notifications may include information such as event type, IP addresses, and any additional cloud vendor-specific metadata. Event listeners register callbacks with the service location broker 506. The callbacks are mapped to service type and/or service group, with the additional option of using pattern matching. These event listeners are then able to process the incoming notifications from the service location broker 506 and dynamically adjust to the changing environment without further configuration.

These notifications, as well as the catalog of services maintained by the service location broker 506, are useful for locating and monitoring services in a dynamic environment. However, these notifications do not provide the ability to link those services to server instances 512 without further assistance. To address this issue, the service data may be coupled with the server instance data maintained by the identity server 508. The service location broker 506 and the identity server 508 may be implemented as part of the same server as the broker application 504, or in one or more servers combined in a network, as will be recognized by those skilled in the relevant art(s).

An identification server (IDS) agent 516 is installed on each server instance 512 and may execute on operating system startup of the server instance 512. For example, an IDS agent 516 may be installed on a single server image so that any subsequent server instances 512 generated from that server image may also include and install the IDS agent 516. When the IDS agent 516 is first installed, an invalid value of zero is written to the durable storage assigned the server image/instance for the OID and the IID. When the IDS agent 516 runs, it notifies the identity server 508 that a server instance 512 has started.

The IDS agent 516 retrieves the OID and IID previously associated with the server instance, if any, from durable storage assigned to the server instance. A server instance 512's files are maintained across server instance restarts, and therefore accessible by the IDS agent 516 upon restart. The IDS agent 516 retrieves the OID and IID information from an instance identity file 514 stored by server instance 512. The IDS agent 516 passes to the identity server 508 the OID and IID retrieved from the instance identity file 514. In an embodiment, the IDS agent 516 may also send the current system configuration information of the server instance 512 (such as, for example, the number of CPUs and available memory).

For a given server instance 512, if an instance identity file 514 does not exist yet, this indicates that the server instance 512 has not been previously registered with an identity server, such as identity server 508. The IDS agent 516 returns a zero value for both the OID and the IID to the identity server 508 in this situation. The identity server 508 will then process this information as discussed above with respect to FIG. 4's depiction of the object tracking algorithm 400.

Figure 8:
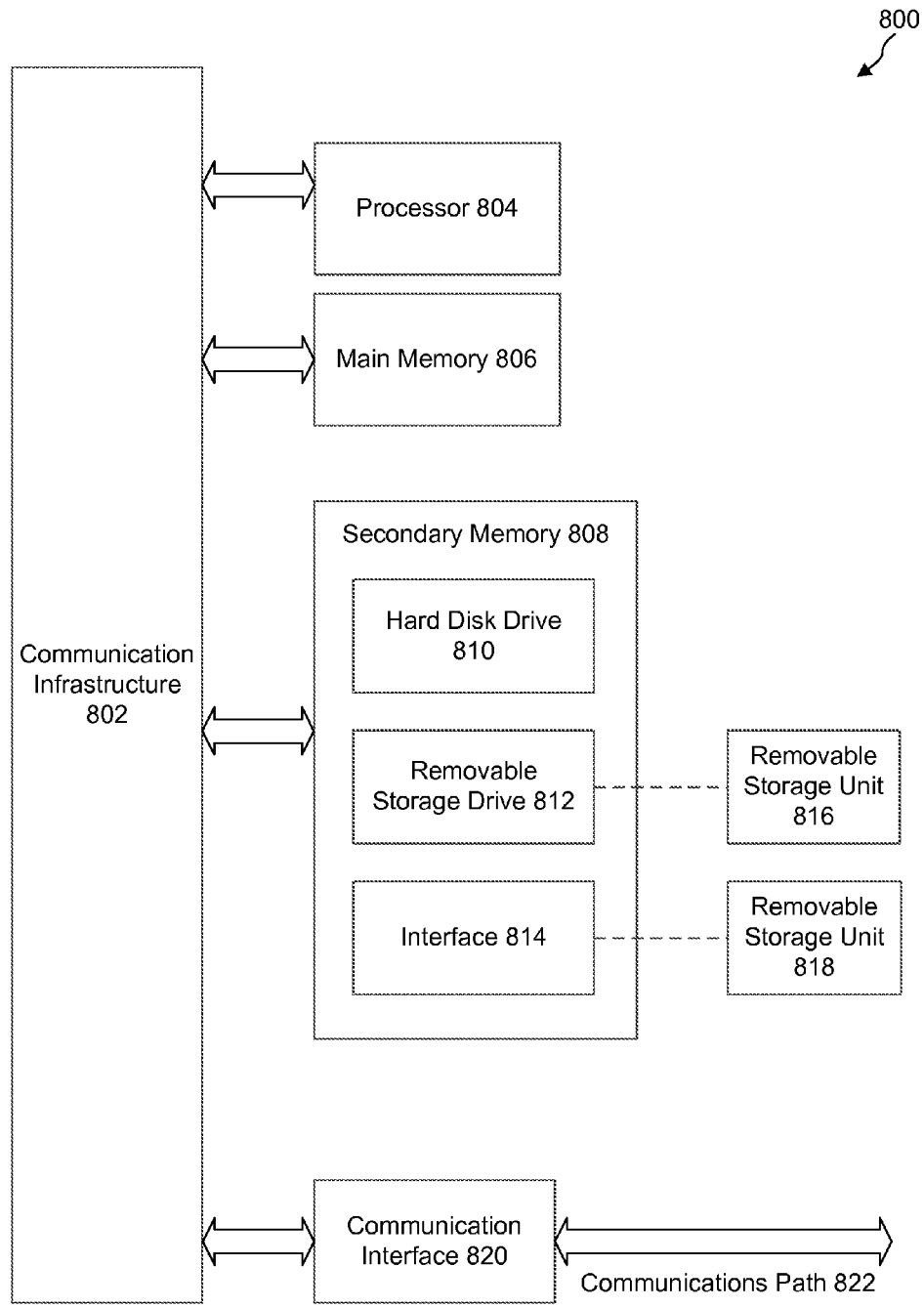
FIG. 8 illustrates an example computer system that can be used to implement aspects of embodiments.

The service location broker 506 and the identity server 508 may be configured, according to an embodiment, as described below in FIG. 8.

Figure 6:
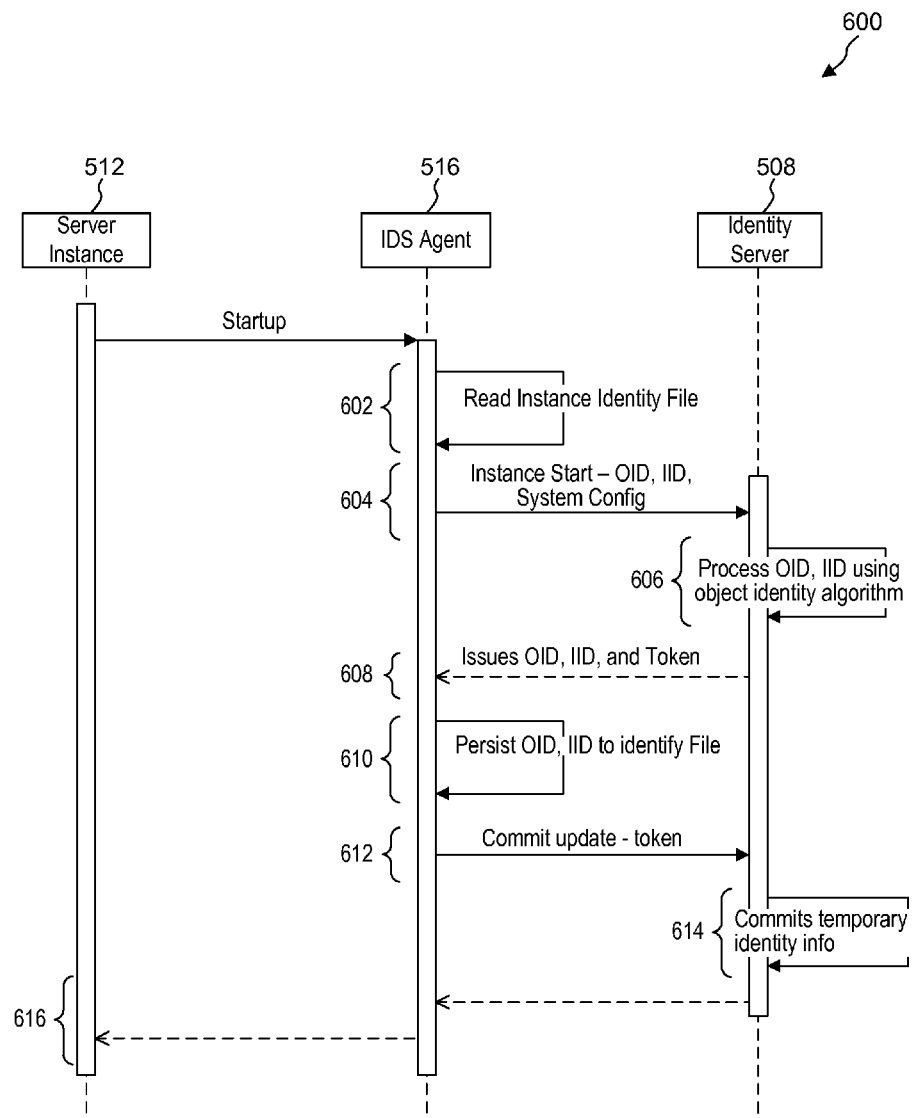
FIG. 6 illustrates an exemplary process flow for tracking objects according to an embodiment.

FIG. 6 illustrates an exemplary process flow 600 for tracking object instances according to an embodiment. FIG. 6 will be discussed with respect to the location broker model introduced in FIG. 5 above.

First, the server instance 512 starts up. At step 602, the IDS agent 516 reads the instance identity file 514 from the durable storage assigned to the server instance 512.

At step 604, the IDS agent 516 transmits the OID and IID retrieved from the instance identity file 514 to the identity server 508. The IDS agent 516 may additionally transmit system configuration information of the server instance 512 with the transmission of the OID and IID. For example, the system configuration information may include the number of CPUs and available memory, among other things.

Once the identity server 508 receives the OID, IID, and system configuration information (when included), at step 606 the identity server 508 processes the OID and IID using the object tracking algorithm 400, as discussed above with respect to FIG. 4. For example, where the present server instance 512 is a clone of a prior server instance and is started before the prior server instance, the object tracking algorithm 400 operates to assign the present (actual clone) server instance 512 the prior server instance's OID and IID. When the prior server instance is then restarted, the object tracking algorithm 400 operates to assign the prior server instance as the clone. The object tracking algorithm 400 then generates a new OID and IID for the prior server instance now identified as the clone. This is possible because the object tracking algorithm 400 does not care which server instance is assigned as the clone for purposes of tracking, because the cloned server instance will share most, if not all, of the attributes of the prior, source server instance. The broker application 504 utilizes a queue for processing, which means that whichever server instance starts first—either the source or the clone—becomes the "source" server instance. The later server instance to start that shares the same OID will be assigned as the clone.

At step 608, the identity server 508 issues an OID, IID, and commit token. As will be recognized from FIG. 4, based on the particular circumstance, the issued OID may be either the same OID as was stored previously in the instance identity file 514, or a newly assigned OID as necessary in a particular circumstance. The commit token may be part of a two-phase commit process between the identity server 508 and the IDS agent 516.

The use of the two-phase commit process prevents the identity server 508 from recording a larger IID to durable storage 510 than what is on the IDS agent 516, in the event that communication fails in returning the modified IID to the IDS agent 516 at step 608. If the IDS agent 516 fails to update based on the IID from the identity server 508, then the use of an IID at the IDS agent 516 that is less than the IID value recorded at the identity server 508 would cause the identity server 508 to treat the server instance 512 as a clone of a previous instance. This would result in issuance of a new OID that would render the tracked genealogy incorrect in the tracked domain.

To avoid this, where the IDS agent 516 is unable to commit the updated IID received from the identity server 508, the IDS agent 516 fails to return the commit token. The identity server 508 will, in this situation, not store the updated IID to durable storage 510. Thus, the IID value stored in the instance identity file 514 of the server instance 512 will be greater than the value stored in the database associated with the identity server 508, located for example in the durable storage 510 when the IDS agent 516 next communicates with the identity server 508 in a new interval. At a new interval, such as with the restart of the server instance 512, the identity server 508 will use the larger IID received from the IDS agent 516. This does not cause any harm to the genealogy of the server instances 512 being tracked by the identity server 508. Although a possible IID value is skipped, the order is still intact and obtainable through a query within the genealogy.

At step 610, the IDS agent 516 writes the OID and IID returned from the identity server 508 to the durable storage assigned to the server instance 512.

At step 612, the IDS agent 516 transmits the commit update token back to the identity server 508, thereby completing the two-phase commit process. This confirms to the identity server 508 that the IID update has been completed in the server instance 512.

At step 614, the identity server 508 sets a flag indicating that the IID has been committed upon receipt of the commit update token. The identity server 508 may then commit the OID and IID back to the database, such as durable storage 510, for future reference and analysis. At step 616, the process ends.

Figure 7:
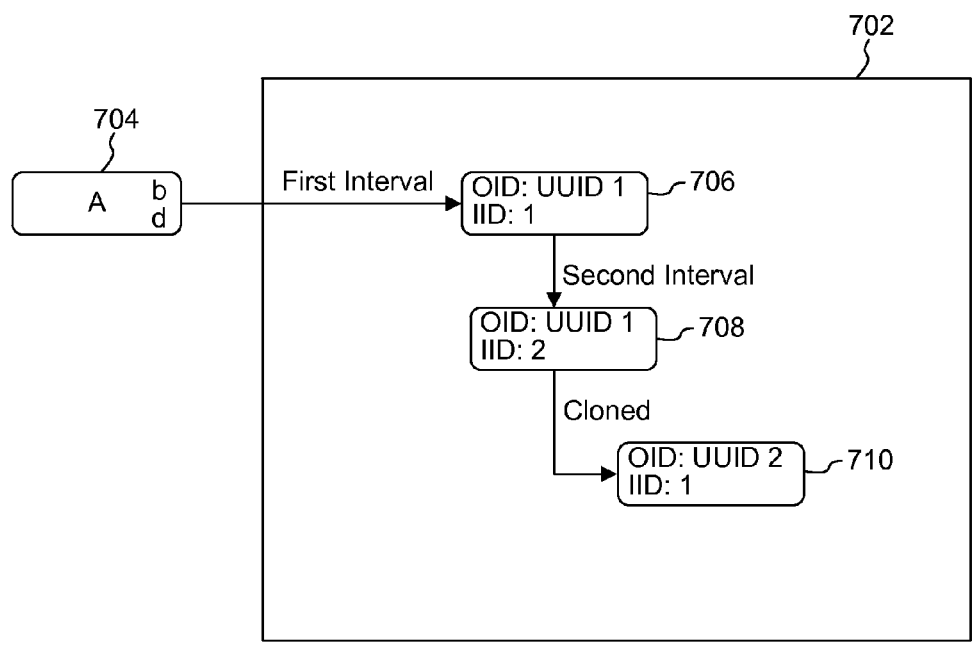
FIG. 7 illustrates an example of a genealogy of an object across multiple intervals, according to an embodiment.

FIG. 7 illustrates an example of a genealogy of instances across multiple intervals, according to an embodiment. For example, FIG. 7 may be an application of the process demonstrated in FIG. 6. The object tracking algorithm 400, as used in step 606 of FIG. 6, uses intervals of server instance execution to track the possibility of change of a server instance 512 over time.

An object 704, such as a server instance 512, first enters domain 702, which for example is the domain being tracked by the object tracking algorithm 400. The server instance 704 enters the domain 702 via an agent, such as IDS agent 516, which is started upon startup of the server instance 704. Upon entering the domain 702, the server instance 704 is assigned an OID and IID, shown in step 706. In FIG. 7, the IID first equals 1, indicating that a first execution interval has just completed at step 706. The completion of a first interval might be represented, for example, by the server instance 704 stopping. The first interval (and each subsequent) represents a possibility that the server instance 704 will be modified during the execution interval.

At step 708, a second execution interval has begun and ended. This interval might represent, for example, the starting and stopping of the server instance 704 again. Once the second execution interval has completed, the IID has been incremented and now has a value of 2.

At step 710, the server instance 704 has been cloned during a new execution interval and therefore receives a new OID. The IID is reset to zero and incremented to one, to indicate that an interval has completed for the cloned server instance. One hereby begins to observe a genealogy of the server instance 704 being tracked within the domain 702. As will be recognized by those skilled in the relevant art(s), more or fewer execution intervals may exist for any given server instance being tracked within the domain 702.

Each interval represents the possibility that a server instance 512 will be modified during the given execution interval. The object tracking algorithm 400 within the domain 702 tracks the number of times a given server instance 704 may have been modified during execution, for example as shown at steps 706, 708, and 710. The object tracking algorithm 400, alone, may not be able to determine if changes were made to a server instance, such as server instance 704, during execution intervals. However, the object tracking algorithm 400 tracks the possibility of change at each execution interval.

For example, in FIG. 7, the user tracking the server instance 704 may know from the object tracking algorithm 400 that if the server instance 704 was cloned after two execution intervals, the clone would have all of the same attributes as the source instance at the conclusion of the source instance's second execution interval at step 708. Further, the user may know that those attributes may be different than the attributes after the first execution interval of the source instance at step 706. In this manner, a genealogy of server instances is created.

The genealogy of server instances as demonstrated in FIG. 7, alone, may provide a large amount of information when tracked over time. This information is useful for application performance management (APM). APM is used for monitoring the performance and availability of applications in a domain being tracked. In a virtual or cloud computing environment, for example, an understanding of the relationship among applications and infrastructure components is useful for providing a comprehensive APM solution. The object tracking algorithm 400 provides this relationship from its use within a domain used for tracking objects for APM. The object tracking algorithm 400 provides a base set of information about the domain it is monitoring, regardless of whether the objects being tracked within the domain are actual hardware, virtualized machines, virtualized machines within a cloud computing environment, or otherwise.

For example, a user may determine from the captured genealogy information (also referred to as the base interval information) provided by the object tracking algorithm 400 at least the following:

(i) The number of server instances created and/or used within the recorded time span (e.g., over multiple intervals);

(ii) When each server instance was created and/or when each server instance entered the domain;

(iii) How many times a server instance was subject to possible change (e.g., starts, restarts, and stops);

(iv) The configuration of the system when each server instance was created;

(v) When each start or restart for the given server instance occurred;

(vi) How many times a server instance was executed;

(vii) How many clones were created from server instances that existed within the domain;

(viii) When a clone was executed/started for the first time;

(ix) From what server instance (e.g., a source instance) and at what interval a clone was created; and (x) The usage pattern of server instances within the domain, e.g. how many instances were created for single execution compared to the number of server instances that were executed multiple times.

Many different agents, such as the IDS agent 516 from FIG. 5, may be useful to provide additional analysis. In addition to the base interval information provided to the APM from the object tracking algorithm 400 about the domain being monitored, additional APM agents may contribute additional data and insight. For example, the IDS agent 516 may provide, in addition to the OID and IID upon startup, configuration information about the host server instance it is installed on. Additional APM agents may include agents particular to the operating system of the server instance, or specific applications running on the server instance. For example, additional agents may include a windows management instrumentation agent specific to the Windows® operating system or a SQL agent, a Java™ agent, a .NET agent, an IIS agent, or an Oracle® agent, all on the application level, just to name a few. Other APM agents are possible and useful to add additional information about the domain being monitored, as will be apparent to persons skilled in the relevant art(s).

These additional APM agents are useful to add information to what may have actually changed in a given interval, as tracked by the IID value of the object identity algorithm 400. This additional information may be combined with the base interval information provided by the object tracking algorithm 400. This increases the number of conclusions that can be made regarding each interval tracked over time. For example, by simply combining the base interval information with the additional information provided by the IDS agent 516 (such as configuration data for the interval), the following may be determined by the user of an APM system (in addition to what can be determined based on the tracked genealogy alone, listed above):

(xi) The configuration of the system when each server instance was created;

(xii) The number of restarts of a given server instance within the recorded time span;

(xiii) The configuration of the system when each restart occurred;

(xiv) How a server instance's configuration has changed over time;

(xv) Whether any identified server instances within the recorded time span were reused with modified configuration details, or new server instances with different configuration details were created instead; and (xvi) The number of server images used to create the recorded server instances.

As discussed above with respect to FIG. 5, the service location broker 506 is useful to provide information about how applications are mapped to their environment. This provides additional information about the services running within the domain being tracked. With this additional information, additional data may be derived. For example, services within the domain may be associated with the genealogy of server instances 512 and their available set of resources at any given point in time. This enables a comprehensive view of an application over time within its dynamic environment. The information provided may not only monitor how the dynamic environment has changed over time, but also why the dynamic environment has changed as much as it has.

For example, in one embodiment, a web application for a store may run within a cloud computing environment, such as the cloud services 102 of FIG. 1. During normal periods of a given year, two servers 104.1 and 104.2 may be sufficient to manage incoming web traffic to the store's web application. However, when a holiday approaches, more servers may need to be provisioned by the cloud services provider to meet the demands of incoming requests to the web application. Where the object tracking algorithm 400 is used by the subscribing client 110, the resulting genealogy and any information obtained from additional agents (such as configuration and service information from an IDS agent) may be used to review the increase in server instances required to meet the heightened demands. The store (subscribing client 110 in this example) may also review the physical resources used for those server instances. Based on this information, the store could better plan for the next holiday season by pre-allocating server instances or additional resources before the site encounters increased traffic. In addition to better meeting customer demand, this may also provide the information necessary to review the cost of cloud computing use over a given time span.

The discussion above has included an exemplary embodiment that implements the object tracking system within a virtualized and/or cloud computing environment. The object tracking system of the present disclosure may also be utilized in any other environments where an object may be subject to change over time.

For example, in an alternative embodiment, the object tracking algorithm 400 may be utilized to track mobile devices, such as cell phones, tablets, laptop computers, etc., that enter and exit a designated area. This may be particularly useful where the mobile device, or the service provider of the mobile device, may not or will not provide identifying information of the mobile device to the system that wants to track devices in the area. The object tracking algorithm 400 may assign each mobile device an OID and IID, as discussed above, to enable tracking of each mobile device while within the area, or domain, being tracked.

Embodiments of the present disclosure can be implemented in hardware, software or as a combination of software and hardware. Consequently, embodiments of the disclosure may be implemented in the environment of a computer system or other processing system. An example of such a computer system 800 is shown in FIG. 8. Embodiments of the present disclosure may execute on one or more computer systems 800. Furthermore, each of the steps of the processes depicted in FIG. 4 or 6 can be implemented on one or more computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCMCIA slot and card, a transceiver, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for tracking an object in a domain using a tracking server, comprising:
   the tracking server receiving an object identifier and an interval identifier of the object from an agent, wherein the agent obtains the object identifier and the interval identifier by accessing a storage;
   the tracking server determining whether the object identifier has been previously stored in a database when the object identifier does not equal zero, wherein the database is accessed by the tracking server;
   the tracking server identifying the object as a copy when the object identifier has been previously stored in the database and the interval identifier is less than a previously stored interval identifier associated with the previously stored object identifier;
   the tracking server replacing the object identifier with a newly generated object identifier and setting the interval identifier equal to zero, when either the object identifier equals zero or the object has been identified as a copy; and
   the tracking server incrementing the interval identifier.

2. The method of claim 1, further comprising:
   transmitting the object identifier and the incremented interval identifier to the object.

3. The method of claim 2, further comprising:
   writing the object identifier and the interval identifier to the storage.

4. The method of claim 2, further comprising:
   issuing a commit token to the object along with the transmitted object identifier and the incremented interval identifier;
   receiving the commit token from the object to confirm the incremented interval identifier; and
   writing the incremented interval identifier to the database upon receipt of the confirmed commit token.

5. The method of claim 1, wherein the object identifier and the interval identifier are read from an instance identity file by an identity agent upon entrance of the object in the domain.

6. The method of claim 1, further comprising:
   receiving current system configuration of the object upon startup of the object in the domain, wherein the object comprises a server instance.

7. The method of claim 1, wherein the interval identifier is configured to identify a possibility of change of the object during an interval represented by the interval identifier.

8. The method of claim 1, wherein the object identifier comprises a Universal Unique Identifier (UUID) that uniquely identifies the object across multiple domains.

9. A system for tracking an object within a domain, comprising:
   a database configured to store object identifiers and associated interval identifiers, wherein the database is accessed by an identification module; and the identification module configured to:
- receive an object identifier and an interval identifier of the object from an agent, wherein the agent obtains the object identifier and the interval identifier by accessing a storage;
- determine whether the object identifier has been previously stored in the database when the object identifier does not equal zero;
- identify the object as a copy when the object identifier has been previously stored in the database and the interval identifier is less than a previously stored interval identifier associated with the object identifier previously stored;
- replace the object identifier with a newly generated object identifier and set the interval identifier equal to zero, when either the object identifier equals zero or the object has been identified as a copy; and
- increment the interval identifier.

10. The system of claim 9, wherein the identification module is further configured to transmit the object identifier and the incremented interval identifier to a processor associated with the object in the domain.

11. The system of claim 10, wherein:
the identification module is further configured to:
- transmit a commit token to the processor associated with the object, and receive the commit token from the object to confirm the incremented interval identifier; and
- write the incremented interval identifier to the database upon receipt of the confirmed commit token.

12. The system of claim 9, wherein the object identifier and the interval identifier are read from an instance identity file by an identity agent upon entrance of the object in the domain.

13. The system of claim 9, wherein the identification module is further configured to receive current system configuration information of the object upon startup of the object in the domain, wherein the object comprises a server instance.

14. The system of claim 13, further comprising:
a service location broker configured to maintain a catalog of available services to the server instance for locating and monitoring the available services.

15. The system of claim 9, wherein the identification module is configured to utilize the interval identifier to identify a possibility of change during an interval represented by the interval identifier.

16. The system of claim 9, wherein the object identifier comprises a Universal Unique Identifier (UUID) that uniquely identifies the object across multiple domains.

17. A non-transitory computer-readable storage medium having control logic recorded thereon that, when executed by a processor, causes the processor to perform a method for tracking an object in a domain, the method comprising:
- receiving an object identifier and an interval identifier of the object from an agent, wherein the agent obtains the object identifier and the interval identifier by accessing a storage;
- determining whether the object identifier has been previously stored in a database when the object identifier does not equal zero, wherein the database is accessed by the processor;
- identifying the object as a copy when the object identifier has been previously stored in the database and the interval identifier is less than a previously stored interval identifier associated with the previously stored object identifier;
- replacing the object identifier with a newly generated object identifier and setting the interval identifier equal to zero, when either the object identifier equals zero or the object has been identified as a copy; and
- incrementing the interval identifier.

18. The non-transitory computer-readable medium of claim 17, further comprising:
- transmitting the object identifier and the incremented interval identifier to the object;
- issuing a commit token to the object along with the transmitted object identifier and the incremented interval identifier;
- receiving the commit token from the object to confirm the incremented interval identifier; and
- writing the incremented interval identifier to the database upon receipt of the confirmed commit token.

19. The non-transitory computer-readable medium of claim 17, further comprising:
receiving current system configuration of the object upon startup of the object in the domain, wherein the object comprises a server instance.

20. The non-transitory computer-readable medium of claim 17, wherein the interval identifier is configured to identify a possibility of change of the object during an interval represented by the interval identifier.

* * * * *